(12) United States Patent
McClain

(10) Patent No.: US 7,605,254 B2
(45) Date of Patent: *Oct. 20, 2009

(54) METHOD OF PRODUCING RESISTANT STARCH

(75) Inventor: James A. McClain, Davenport, IA (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/782,215

(22) Filed: Feb. 19, 2004

(65) Prior Publication Data

US 2004/0167325 A1      Aug. 26, 2004

Related U.S. Application Data

(60) Provisional application No. 60/448,425, filed on Feb. 20, 2003.

(51) Int. Cl.
    C08B 30/00    (2006.01)
(52) U.S. Cl. .................................................. 536/102
(58) Field of Classification Search ................ 536/102
    See application file for complete search history.

(56) References Cited

U.S. PATENT DOCUMENTS

| | | | |
|---|---|---|---|
| 853,828 A | 5/1907 | Reynolds | |
| 2,014,799 A | 9/1935 | Fuller | |
| 2,287,599 A * | 6/1942 | Bulfer et al. | 127/38 |
| 2,503,053 A | 4/1950 | Kerr | |
| 2,845,368 A | 7/1958 | Fredrickson | |
| 4,549,909 A | 10/1985 | Samuel et al. | |
| 5,281,276 A | 1/1994 | Chiu et al. | |
| 5,336,328 A | 8/1994 | Mauro et al. | |
| 5,358,729 A * | 10/1994 | Ohkuma et al. | 426/567 |
| 5,430,141 A | 7/1995 | Ohkuma et al. | |
| 5,472,732 A | 12/1995 | Ohkuma et al. | |
| 5,593,503 A | 1/1997 | Shi et al. | |
| 5,629,036 A | 5/1997 | Yanetani et al. | |
| 5,849,090 A | 12/1998 | Haralampu et al. | |
| 5,902,410 A | 5/1999 | Chiu et al. | |
| 6,013,299 A | 1/2000 | Haynes et al. | |
| 6,090,594 A | 7/2000 | Kettlitz et al. | |
| 6,191,116 B1 | 2/2001 | Kasica et al. | |
| 6,274,567 B1 | 8/2001 | Brown et al. | |
| 6,303,174 B1 | 10/2001 | McNaught et al. | |
| 6,844,022 B2 * | 1/2005 | Klingler et al. | 426/661 |

| | | |
|---|---|---|
| 2004/0167325 A1 | 8/2004 | McClain |

FOREIGN PATENT DOCUMENTS

| | | |
|---|---|---|
| EP | 0463935 | 2/1992 |
| EP | 0540421 | 5/1993 |
| EP | 0 652 701 B1 | 1/2002 |
| JP | 08009953 | 1/1996 |
| WO | WO 90/15147 | 12/1990 |
| WO | WO 94/03049 | 2/1994 |
| WO | WO 99/64466 | 12/1999 |
| WO | WO 03010277 | 2/2003 |

OTHER PUBLICATIONS

Wurzburg, Modified Starches: Properties and Uses, CRC Press, 1986, pp. 33-34.*
Wurzburg, O.B., Modified Starches: Properties and Uses, CRC Press Inc., Boca Raton, FL (1986), pp. 33-34.
Geerdes, J.D. et al., The Constitution of Corn Starch Dextrin, J. Am. Chem. Soc., (1957), vol. 79, pp. 4209-4212.
Christensen, G.M. et al., The Constitution of Wheat Starch Dextrin, J. Am. Chem. Soc., (1957), vol. 79, pp. 4492-4495.
Wiejak, Stanislaw et al., The Thermal Decomposition of Carbohydrates. Part II. The Decomposition of Starch. Advances in Carbohydrate Chemistry (1990), vol. 47, pp. 279-343.
Shallenberger. R.S. et al., Sugar Chemistry, AVI, Westport, CT (1975), pp. 169-177.
European Patent Office Form PCT/ISA/220—Notification of Transmittal of the International Search Report and the Written Opinion of the International Searching Authority, or the Declaration; International Application No. PCT/US2004/004989; International Filing Date Feb. 19, 2004.
International Preliminary Report on Patentability for International Application No. PCT/US2004/004989, The International Bureau of WIPO, 2 pp. (Sep. 9, 2005).
Written Opinion of the International Searching Authority for International Application No. PCT/US2004/004989, European Patent Office (acting as International Searching Authority), 5 pp. (Sep. 9, 2005).

(Continued)

*Primary Examiner*—Shaojia Anna Jiang
*Assistant Examiner*—Ganapathy Krishnan

(57) ABSTRACT

This invention relates to the production of resistant starch. Preferably, this invention relates to the production of resistant starch comprising selecting a reaction temperature, acidifying unmodified starch to a pH, wherein the pH is optimum to convert the unmodified starch to resistant starch when at the reaction temperature, heating the acidified unmodified starch to about the reaction temperature, and maintaining the acidified unmodified starch close to about the reaction temperature until the maximum yield of resistant starch has been obtained while maintaining a whiteness level between about 65 and about 100.

17 Claims, 1 Drawing Sheet

OTHER PUBLICATIONS

Figure 1:
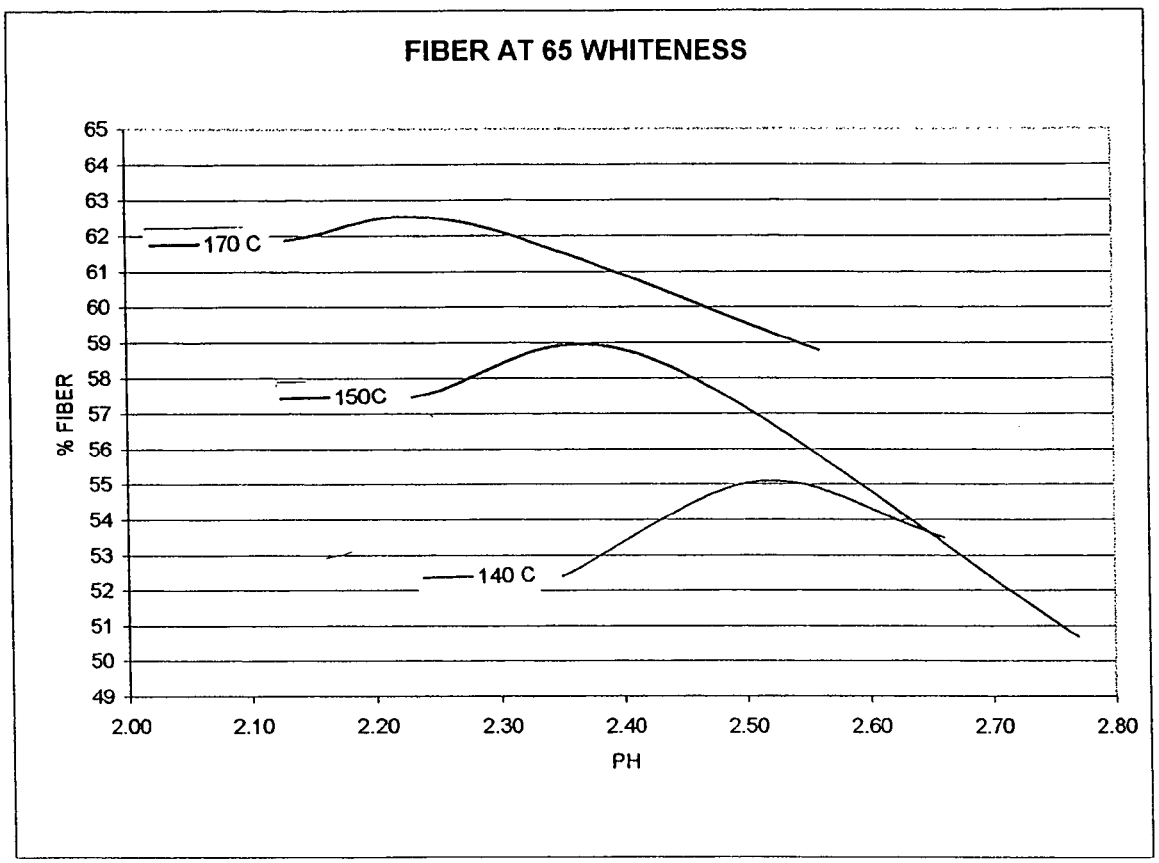

Smith, L.T. et al., "Dextrinization of Potato Starch with Gaseous Hydrogen Chloride," *Industrial and Engineering Chemistry*, American Chemical Society, U.S., vol. 36, 1944, pp. 1052-1054.

"Instant Gratification", Sep. 1999 Printed from http://www.foodproductdesign.com/archive/1999/0999cs.html, pp. 1-9.

"Pass the Powdered Beans", Jul. 2000 Printed from http://www.backpacker.com/article/1,2646,1162_P,00.html, pp. 1-5.

"Entrees for a Small Planet", May 2002 Printed from http://www.foodproductdesion.com/archive/2002/0502CS.html, pp. 1-14.

"New 2005 Food Pyramid Information", Nov. 2005 Printed from http://www.ring.com/health/food/food.htm, pp. 1-13.

Nutritional Value and Composition of Canned Beans, Nov. 2005 Printed from http://www.nebraskadrybean.com/nutrition.htm, pp. 1-3.

"Junk Food Laws Take Aim at Child Obesity", Nov. 2005 Printed from http://www.sacbee.com/content/politics/ca/story/13567361p-14407868c.html, pp. 1-6.

"The Salsa Saga", Apr. 1998 Printed from http://www.foodproductdesign.com/archive/1998/0498AP.html, pp. 1-9.

"Development of Biotechnology to Produce Low-Flatulence Dehydrated Pinto Bean Products" http://www.northarvestbean.org/html/news.cfm?ID=450, pp. 1-2.

"You Don't Know Beans About Legume Flours", Nov. 2005 Printed from http://www.foodprocessing.com/articles/2005/400.html, p. 1-4.

Specification sheet for Refried Black Beans, Nov. 2005 Printed from http://www.admworld.com/naen/productdb/details.asp?code=448, p. 1.

Laurentin, et al., "Preparation of Indigestible Pyrodextrins from Different Starch Sources," *Journal of Agricultural and Food Chemistry*, 51:18, pp. 5510-5515 (2003).

Specification sheet for Whole Black Beans, Nov. 2005 Printed from http://www.admworld.com/naen/productdb/details.asp?code=451, p. 1.

"Nutrition and Your Health: Dietary Guidelines for Americans", Nov. 2005 Printed from http://www.health.gov/dietaryguidelnes/dga2005/report/HTML/A_ExecSummary.htm, p. 1-14.

Specification sheet for Black Bean Flour, Nov. 2005 Printed from http://www.bobsredmill.com/catalog/index.php?action=showdetails&product_ID=71, p. 1-2.

"Inhibition of the Phosphatidylinositol 3-Kinase/Akt Pathway by Inositol Pentakisphosphate Results in Antiangiogenic and Antitumor Effects", Sep. 2005, *Cancer Research*, vol. 65 Printed from www.aacrjournals.org, p. 8384-49.

"My Pyramid Steps to a Healthier You", Apr. 2005, pp. 1-2.

Specification sheet for Smooth Style Refried Pinto Bean, Mar. 2004, pp. 1-2.

"Will Canada Nix Nuggets and Fries?", Sep. 2005 Printed from http://www.theglobeandmail.com/servlet/ArticleNews/TPStory/LAC/20050929/HJUNKF . . . , pp. 1-3.

"Effect of Processing on Some Chemical and Nutritional Characteristics of Pre-cooked and Dehydrated Legumes," *Plant Foods for Human Nutrition*, vol. 41, pp. 193-201, 1991.

Specification sheet for Edible Beans, printed from http://www.admworld.com, pp. 1-3.

Phytate Degradation Determines the Effect of Industrial Processing and Home Cooking on Iron Absorption from Cereal-based Foods, *British Journal of Nutrition*, vol. 88, pp. 117-123, 2002.

"Crossing Borders: Designing for the Hispanic Demographic", *Food Product Design*, Sep. 2004, pp. 1-13.

Search results for gluten free items, Sep. 2005 Printed from http://www.bobsredmill.com/catalog/index.php?action=do_search&keywords=&condition . . . , pp. 1-3.

* cited by examiner

METHOD OF PRODUCING RESISTANT STARCH

CROSS REFERENCE TO RELATED APPLICATION

This application claims priority to U.S. Provisional Patent Application Ser. No. 60/448,425, entitled "Method of Producing Resistant Starch", filed Feb. 20, 2003, which is incorporated by reference herein in its entirety.

BACKGROUND OF THE INVENTION

1. Field of the Invention

This invention relates to the production of resistant starch. Preferably, this invention relates to the production of resistant starch comprising selecting a reaction temperature, acidifying unmodified starch to a pH, wherein the pH is optimum to convert the unmodified starch to resistant starch when at the reaction temperature, heating the acidified unmodified starch to about the reaction temperature, and maintaining the acidified unmodified starch close to about the reaction temperature until the maximum yield of resistant starch has been obtained while maintaining a whiteness level between about 50 and about 100.

2. Background Art

The present invention relates to a method of producing resistant starch.

Starch is a naturally occurring polymer made up of anhydroglucose units and is obtained by processing plant materials. The plant materials from which starch is derived include, but are not limited to corn, wheat, potato, casava, and rice. Of these plant materials, corn is one of the most commonly used sources for starch in North America.

Starch is used in a wide number of applications, both industrial and private. These uses include food products, papermaking, corrugated boxes, glue, baby powder and textiles. Food products produced from starch are varied and include dextrose, corn syrup, high fructose corn syrup, crystalline dextrose, fructose, xanthan gum, citric acid, lactic acid, sorbitol, lysine, threonine, riboflavin and distilled spirits.

An additional product is resistant starch, which is a name given to starches which are not digested. Resistant starch is an important part of the human diet. It has been shown to promote intestinal regularity, moderate post-prandial blood glucose levels and lower serum cholesterol and triglyceride levels. Resistant starch is obtained by the manufacture of pyrodextrins which are made at low moisture and low pH by the action of heat and a catalyst such as hydrochloric acid to produce a slightly yellow powder.

Improvements in the standard of living and eating habits, among other factors, have resulted in a lengthened average life span. Accordingly, people have become health oriented. Attention has therefore been directed to dietary fibers and oligosaccharides to enhance the functions of foods and livestock feeds in that these materials are known to alleviate constipation and other desired biological regulatory functions. Indigestible substances, like resistant starches, exhibit various modes of behavior on the digestive tracts, producing physiological effects on the living body. First, in the upper digestive tract resistant starches slow the transport of food and delay the absorption of nutrients. Delayed absorption of sugar, for example, suppresses the rise in blood sugar value, consequently lowering insulin requirements. Further, excretion of bile is promoted, diminishing the sterol group in the body thereby lowering the cholesterol level in the serum. Other physiological effects through the endocrine system are also reported.

Another feature of these indigestible substances is they are not digested or absorbed by the digestive tract, including the small intestine and reach the large intestine. On reaching the large intestine, oligosaccharides, dietary fibers and resistant starches are partly acted on by enterobacteria yielding short-chain fatty acids, intestinal gases, vitamins, etc. Acidification of the intestinal environment by the short-chain fatty acids condition the intestine. It has also been reported that when these short chain fatty acids are metabolized, they provide energy and inhibit the synthesis of cholesterol. Therefore, indigestible substances are necessary in obtaining many desirable physiological effects.

Examples of water-soluble indigestible substances include guar gum, glucomannan, pectin and like natural gums which have high viscosity which are difficult to ingest singly in high amounts. The addition of these indigestible substances to processed foods encounters problems in preparing the food and presents difficulties with respect to texture. It is therefore desirable to provide dietary indigestible substances, like resistant starches, which are easy to ingest and are user friendly in preparing processed food.

Starch is used in large quantities in various processed foods as a food material. Useful food materials of these types include starch and starch products such as pregelatinized starch, pyrodextrin and its derivatives, glucose, corn syrup solids and maltodextrin. However, a majority of these starch products are not higher than 5% in the content of indigestible component.

Starch consists primarily of alpha (1→4) and alpha (1→6) glucosidic linkages. It is well known that resistant starches can be prepared by heat-treating a starch at a high temperature, however, the mechanism of resistant starch development is complex. During the initial stages of dextrinization, acid-catalyzed hydrolysis occurs. This is followed by a recombination of the fragments to form branched structures. Specifically, the dextrinization process converts a portion of the normal alpha-1,4 glucosidic linkages to random 1,2-, 1,3- and 1,4-alpha or beta linkages (O. B. Wurzburg, in Modified Starches: Properties and Uses, CRC Press Inc., Boca Raton, Fla. (1986) pp. 33-34).

These branched structures containing the new bonds are not digestible by maltase and isomaltase in the small intestine. This is because the human digestive system effectively digests only alpha 1,4-linkages. The majority of the resistant starch reaches the large intestine and this conforms to the definition of dietary fiber since it is defined as components of plant material in the diet which are resistant to digestion by enzymes produced by human in the small intestine.

Some methods of producing various resistant starches are known in the art. British gum is obtained by heating starch at 135° C. to 218° C. in the absence of acid catalyst for 3 to 8 hours. White dextrin is prepared by heating starch at 79° C. to 121° C. in the presence of acid catalyst for 3 to 8 hours. Yellow dextrin is prepared similarly by heating the starch at 150° C. to 220° C., with the addition of acid catalyst for 6 to 8 hours.

Proportions of glycosidic linkages have been disclosed (J. D. Geerder et al., J. Am. Chem. Soc., 79: 4209 (1957); G. M. Christensen et al., J. Am. Chem. Soc., 79:4492 (1957)). Compositional analysis reveals that the pyrodextrin obtained by heat treating corn starch with hydrochloric acid comprises at least about 57.3% of 1→4 glycosidic linkage fraction, about 2.6% of 1→6 glycosidic fraction, up to about 1.2% of 1→3 glycosidic fraction, about 6.3% of a fraction having both 1→4 and 1→6 linkages and about 20% having other glycosidic linkages.

Tomasik, P. and Wiejak, S., (Advances in Carbohydrate Chemistry, 47: 279-343 (1990)) generally describe the state of the art as to processes for preparing pyrodextrins and resistant starches.

A process for preparing a dextrin containing an indigestible component has been disclosed (Ohkuma et al., U.S. Pat. No. 5,364,652). This disclosure indicated that if the reaction temperature is higher, the resulting product will contain increased amounts of dietary fiber. A process for preparing dextrin that includes a specific pH acid catalysis, a specific heat, and the digestion of the pyrodextrin with a-amylase has been described (Ohkuma et al., U.S. Pat. No. 5,620,873).

In preparation of resistant starch in dextrin, heat, acid, and time are employed to rearrange the molecular structure to form indigestible branched structures. This also results in the development of color due to caramelization reactions. Caramelization reactions are a diverse group of dehydration, fragmentation and polymerization reactions whose reactions are dependent on temperature and pH (R. S. Shallenberger and G. G. Birch, Sugar Chemistry, AVI, Westport, Conn. (1975) pp. 169-177). The dextrinized starch will typically take on a yellow color depending on the specifics of the reaction conditions.

It is preferable that dextrinization products be almost colorless in solution due to the application of dextrin in the food industry. Any color developed in the dextrinization process is not desirable in the final product and is largely removed through subsequent and costly decolorization steps. In order to minimize the costs associated with color removal, a dextrinized starch with low color development would be advantageous.

However, development of resistant starch in dextrin typically occurs contemporaneously with color development. The object however is to manufacture a dextrin with the greatest degree of resistant starch possible while minimizing the objectionable color formation.

In actual operation, the color is measured by a whiteness meter where the higher the number, the more "white" the product. When a process to manufacture resistant starch is designed, it takes into account the target whiteness of the dextrin. The reason for a target whiteness level is that the decolorization steps can only treat a certain amount of color bodies before recharging. In order to keep costs at economic levels, the dextrinized starch must not be too colored. For example, it has been found that by maintaining a whiteness level of 65 or higher, the subsequent decolorization steps result in an end product of sufficient whiteness that is also economically viable.

The object of the dextrinization process would therefore be to produce a dextrin containing the highest amount of resistant starch possible while maintaining a whiteness of at least 65. Other whiteness targets can be used but they would need either more, or less, equipment to remove color depending on whether it has a lower whiteness (more equipment and materials) or a higher whiteness (less equipment and materials).

BRIEF SUMMARY OF THE INVENTION

It is a general object of the invention to provide a method of producing resistant starch.

It is a specific object of the invention to provide a method of producing resistant starch comprising selecting a reaction temperature, acidifying unmodified starch to a pH, wherein the pH is optimum to convert the unmodified starch to resistant starch when at the reaction temperature, heating the acidified unmodified starch to about the reaction temperature, and maintaining the acidified unmodified starch close to about the reaction temperature until the maximum yield of resistant starch has been obtained while maintaining a whiteness level between about 50 and about 100.

In another embodiment, the present invention provides a method of producing resistant starch comprising acidifying unmodified starch to a pH and a reaction temperature, wherein said pH is selected relative to said reaction temperature such that said pH may be optimum thereto to convert said unmodified starch to resistant starch when at said reaction temperature, heating said acidified unmodified starch to about the reaction temperature, and maintaining said acidified unmodified starch close to about the reaction temperature such that the maximum yield of resistant starch may be obtained while maintaining a whiteness level between about 50 and about 100.

In another embodiment, the present invention provides a resistant starch formed by the process set forth immediately above.

It should be understood that this invention is not limited to the embodiments disclosed in this summary, but it is intended to cover modifications that are within the spirit and scope of the invention, as defined by the appended claims.

BRIEF DESCRIPTION OF THE DRAWINGS/FIGURES

FIGURE 1 illustrates the relationship between pH at a given temperature in the optimization of resistant starch in a dextrinization reaction. The chart also illustrates that the optimum pH (at a given temperature) decreases with increasing reaction temperature.

DETAILED DESCRIPTION OF THE INVENTION

The present invention fulfills the need to produce a pyrodextrin containing high amounts of resistant starch while maintaining a low level of color development. The present invention optimizes the pH (at a given temperature) of the acid-catalyzed dextrinization reaction to maximize resistant starch development while maintaining a low level of color development. By varying the pH of the starch used in the dextrinization process, the reaction mechanisms involved in resistant starch and color development can be manipulated so that greater amounts of resistant starch can be produced while maintaining an acceptable color.

The present invention demonstrates that there is an optimum pH, at a given reaction temperature, where resistant starch development is maximized while maintaining an acceptable color.

In some embodiments of the invention, starch with a moisture content between 2% and 6% is acidified to yield a pH between 1.9 and 3.1. The starch is acidified with either aqueous or gaseous hydrochloric acid and then heated to between 140° C. and 180° C. until the maximum resistant starch has been reached while maintaining an acceptable color.

By using the method of the present invention, the pH of the acid-catalyzed dextrinization reaction can be optimized at a given temperature to produce a maximum resistant starch yield while maintaining a low level of color development.

The term "dextrinization" refers to the process of heating dried granular starch in the presence of an acid catalyst leading to partial hydrolysis of the starch polymer and subsequent recombination of the fragments into branched structures which are resistant to digestion by enzymes produced in the human body's small intestine.

The term "resistant starch" refers to components of plant material in the diet which are resistant to digestion by enzymes produced by humans in the small intestine. Resistant starch in the dextrinized starch is measured by adaptation of the Prosky-AOAC method. This method consists of three steps. First, the resistant starch is digested with about 50 µl of alpha-amylase, wherein about 0.4 grams of dextrin are dissolved in 20 ml of 0.1 M phosphate buffer and heated to 95° C. for 30 minutes. Second, the contents are then diluted to 50 mL with distilled water, adjusted to a pH of about 4.0-4.7 with 0.3 M hydrochloric acid, digested with 50 µL of glucoamylase, and then incubated at 60° C. for 40 minutes. Thirdly, the contents are diluted up to 100 mL and glucose is measured by an appropriate method. Resistant starch is calculated by the formula:

$$((\text{Mass Dextrin} - 0.9 \times \text{Mass Glucose})/\text{Mass Dextrin}) \times 100\%$$

The typical method of dextrinization involves drying of unmodified starch to between a moisture content of about 2% and 6% and then acidifying the starch to a pH between 1.9 and 3.1 using gaseous hydrochloric acid. The acidified starch is then subjected to temperature between 140° C. and 180° C. until the maximum resistant starch has been reached while maintaining an acceptable color.

The pH and temperature used in the present invention demonstrated an unexpected result. It was discovered that for a given temperature there was an optimum pH where resistant starch production was maximized. Previously, it was thought that decreasing the pH (or increasing acidity) would increase resistant starch production since the hydrogen ion catalyst is at a greater concentration. Another unexpected result was that the optimum pH, at a given reaction temperature, decreases with increasing reaction temperature.

The present invention is directed to a method of producing resistant starch comprising selecting a reaction temperature; acidifying unmodified starch to a pH, wherein said pH is optimum to convert said unmodified starch to resistant starch when at said reaction temperature; heating said acidified unmodified starch to about the reaction temperature; and maintaining said acidified unmodified starch close to about the reaction temperature until the maximum yield of resistant starch has been obtained while maintaining a whiteness level between about 50 and about 100.

Various acid catalysts may be used in the acidification of the unmodified starch. In some embodiments, the unmodified starch is acidified with chlorine gas or monochloracetic acid. In some embodiments, the unmodified starch is acidified with aqueous hydrochloric acid. In further embodiments the unmodified starch is acidified with gaseous hydrochloric acid.

Various pH levels may be used to acidify the unmodified starch. Preferably, the optimal pH of the acidified unmodified starch is between about 1 and about 4. More preferably, the optimal pH of acidified unmodified starch is between about 2 and about 3. Most preferably the optimal pH of acidified unmodified starch is about 2.4.

Various reaction temperatures may be used. Preferably, the reaction temperature is between about 140° C. and about 180° C. More preferably, the reaction temperature is between about 160° C. and about 175° C. Most preferably, the reaction temperature is about 170° C.

Various whiteness levels maybe selected. The whiteness levels identified herein were determined using a Kett Electric Laboratory Whiteness meter model C-1, with a range of 0 to 100. As those in the art can appreciate, different instruments manufactured by different companies can provide different whiteness levels. Thus, the whiteness levels are relative and are to be considered in view of utilization of a Kett Electric Laboratory Whiteness meter. Preferably, the whiteness level is between about 50 and about 100. More preferably, the whiteness level is between about 60 and about 100. Most preferably, the whiteness level is between about 65 and about 100. It is important to note that while the examples use a whiteness level target of about 65 for the pyrodextrin, the invention is not limited to this value. Indeed, those skilled in the art can use this knowledge and apply it to other whiteness levels.

All of the dextrinization reactions discussed herein are performed on dried granular starch. The term "dried granular starch" refers to starch that is not moisture free, but has moisture inherent in the starch while retaining its granular, free flowing characteristics. In some embodiments, the moisture content of the unmodified starch is between about 2% and about 6%. In some embodiments, the unmodified starch is acidified before the moisture content is reduced to between about 2% and about 6%. While work was performed at initial starch moisture content of about 4%, a person skilled in the art will be able to use the present invention to find the optimal pH at a given temperature for a given initial starch moisture.

Various yields of resistant starch may be obtained by use of the invention. Preferably, the percentage yield of the resistant starch is greater than about 50%. More preferably, the percentage yield of the resistant starch is greater than about 60%.

Preferably, the reaction temperature is between about 140° C. and about 180° C.; the pH is between about 1 and about 4; and the whiteness level is between about 65 and about 100.

More preferably, the reaction temperature is between about 160° C. and about 175° C.; the pH is between about 2 and about 3; and the whiteness level is between about 65 and about 100.

Most preferably, the reaction temperature is about 170° C.; the pH is about 2.4; and the whiteness level is between about 65 and about 100.

In a preferred embodiment of the invention, the starch has a moisture content of about 4% and is acidified with gaseous hydrochloric acid to a pH of about 2.4; the reaction temperature is about 160° C.; and the whiteness level is between about 65 and about 100.

The unmodified starch may be derived from numerous sources known to those skilled in the art. In some embodiments, the unmodified starch is derived from corn, potatoes, rice, casava, or wheat. In a more particular embodiment, the unmodified starch is derived from corn.

The method of producing resistant starch described herein can further comprise the manufacture of a food product from said resistant starch.

As one skilled in the art will recognize, the present invention provides a method to maximize the yield of resistant starch in a dextrinization reaction by optimizing the pH at a given temperature while maintaining a low level of color development.

Having now generally described the invention, the same will be more readily understood through reference to the following examples which are provided by way of illustration, and are not intended to be limiting to the present invention, unless specified.

EXAMPLES

The following examples illustrate the present invention and the advantages thereof.

Example 1

Corn starch with a 4% moisture content is acidified using gaseous hydrochloric acid. The amount of acid catalyst is adjusted to provide a pH of 2.5. The pH is measured by slurrying 25 g of acidified starch in 50 mL deionized water. The acidified starch is then subjected to a temperature of 140° C. until a whiteness of 65 is reached. The amount of resistant starch present in the dextrinized starch is 55.1%. The starch was also acidified to a pH of 2.4 and 2.7 at 140° C. and a yield of 52.4% and 53.5% resistant starch, respectfully, was produced.

This example illustrates that the present invention provides a method to maximize the yield of resistant starch in a dextrinization reaction by optimizing the pH at a given temperature while maintaining a low level of color development.

Example 2

Corn starch with a 4% moisture content is acidified using gaseous hydrochloric acid. The amount of acid catalyst is adjusted to provide a pH of 2.4. The pH is measured by slurrying 25 g of acidified starch in 50 mL deionized water. The acidified starch is then subjected to a temperature of 150° C. until a whiteness of 65 is reached. The amount of resistant starch present in the dextrinized starch is 58.6%.

The starch was also acidified to a pH of 2.2 using the conditions listed above, with a yield of resistant starch of 57.5%. Additionally, the starch was acidified to a pH of 2.8 using the conditions listed above, with a yield of 50.7%.

This example illustrates that the present invention provides a method to maximize the yield of resistant starch in a dextrinization reaction by optimizing the pH at a given temperature while maintaining a low level of color development.

Example 3

Corn starch with a 4% moisture content is acidified using gaseous hydrochloric acid. The amount of acid catalyst is adjusted to provide a pH of 2.3. The pH is measured by slurrying 25 g of acidified starch in 50 mL deionized water. The acidified starch is then subjected to a temperature of 170° C. until a whiteness of 65 is reached. The amount of resistant starch present in the dextrinized starch is 62.4%.

The starch was also acidified to a pH of 2.1 using the conditions listed above, with a yield of resistant starch of 61.9%. Additionally, the starch was acidified to a pH of 2.6 using the conditions listed above, with a yield of 58.8%.

This example illustrates that the present invention provides a method to maximize the yield of resistant starch in a dextrinization reaction by optimizing the pH at a given temperature while maintaining a low level of color development.

While the invention has been particularly shown and described with the reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued or foreign patents, or any other references, are each entirely incorporated by reference herein, including all data, tables, figures, and text presented in the cited references.

What is claimed is:

1. A method of producing resistant starch comprising:
    (a) selecting a reaction temperature of 140° C. to 180° C.;
    (b) acidifying unmodified starch to a selected pH of about 1 to about 4 with hydrochloric acid, wherein said selected pH is optimum to convert said unmodified starch to resistant starch when at said reaction temperature;
    (c) heating said acidified unmodified starch to said reaction temperature; and
    (d) maintaining said acidified unmodified starch close to said reaction temperature until a maximized yield of resistant starch has been obtained while maintaining a whiteness level of at least 65.

2. The method of claim 1, wherein said unmodified starch of step (b) is acidified with aqueous hydrochloric acid.

3. The method of claim 1, wherein said unmodified starch of step (b) is acidified with gaseous hydrochloric acid.

4. The method of claim 1, wherein said optimal pH of acidified unmodified starch of step (b) is between about 2 and about 3.

5. The method of claim 1, wherein said optimal pH of acidified unmodified starch of step (b) is about 2.4.

6. The method of claim 1, wherein said reaction temperature is between 160° C. and 175° C.

7. The method of claim 1, wherein said reaction temperature is 170° C.

8. The method of claim 1, wherein a moisture content of said unmodified starch is between about 2% and about 6%.

9. The method of claim 1, wherein said unmodified starch is acidified before a moisture content is reduced to between about 2% and about 6%.

10. The method of claim 1, wherein said maximized yield of said resistant starch is greater than about 50%.

11. The method of claim 1, wherein said maximized yield of said resistant starch is greater than about 60%.

12. The method of claim 1, wherein:
    said reaction temperature is between 160° C. and 175° C.; and
    said pH is between about 2 and about 3.

13. The method of claim 1, wherein:
    said reaction temperature is 170° C.; and
    said pH is about 2.4.

14. The method of claim 1, wherein:
    said starch has a moisture content of about 4% and is acidified with gaseous hydrochloric acid to a pH of about 2.4; and
    said reaction temperature is 160° C.

15. The method of claim 1, wherein said unmodified starch is derived from corn.

16. The method of claim 1, wherein said unmodified starch is derived from potatoes, rice, cassava, or wheat.

17. The method of claim 1, further comprising:
    (e) manufacturing a food product from said resistant starch.

* * * * *